(12) United States Patent
Tiberghien et al.

(10) Patent No.: US 9,752,713 B2
(45) Date of Patent: Sep. 5, 2017

(54) FEMALE QUICK-CONNECT COUPLING ELEMENT, AND A QUICK-CONNECT COUPLING INCORPORATING SUCH AN ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR)

(73) Assignee: STAUBLI FAVERGES, Faverges (FR)

( * ) Notice: Subject to any disclaimer, the term of this patent is extended or adjusted under 35 U.S.C. 154(b) by 649 days.

(21) Appl. No.: 14/084,117

(22) Filed: Nov. 19, 2013

(65) Prior Publication Data
US 2014/0145430 A1 May 29, 2014

(30) Foreign Application Priority Data
Nov. 23, 2012 (FR) ...................................... 12 61180

(51) Int. Cl.
*F16L 37/18* (2006.01)
*F16L 37/23* (2006.01)
*F16L 37/42* (2006.01)

(52) U.S. Cl.
CPC ............... *F16L 37/23* (2013.01); *F16L 37/42* (2013.01)

(58) Field of Classification Search
CPC .................................. F16L 37/23; F16L 37/42
USPC ........................................ 285/316; 251/149.9
See application file for complete search history.

(56) References Cited

U.S. PATENT DOCUMENTS

| | | | | |
|---|---|---|---|---|
| 4,269,389 A | * | 5/1981 | Ekman .................... | F16L 37/23 137/614.03 |
| 4,583,711 A | * | 4/1986 | Johnson ................... | F16L 37/23 137/614 |
| 4,664,148 A | * | 5/1987 | Magnuson .............. | F16L 37/23 137/614.05 |
| 6,029,701 A | * | 2/2000 | Chaffardon ............. | F16L 37/28 137/614.06 |
| 6,379,072 B1 | * | 4/2002 | Brown ................ | B29C 45/1775 403/31 |

(Continued)

FOREIGN PATENT DOCUMENTS

| CN | 1616880 | 5/2005 |
|---|---|---|
| CN | 100595464 | 3/2010 |

(Continued)

*Primary Examiner* — Brian Glessner
*Assistant Examiner* — Joshua Ihezie
(74) *Attorney, Agent, or Firm* — Dowell & Dowell, PC (57) ABSTRACT

This female quick-connect coupling element comprises balls for locking a male element in a coupled configuration, positioned in radial housings of a body and able to protrude radially in an insertion channel, and an actuating member mobile between a first position, in which the male element is locked in the female element in coupled configuration, and a second position, in which the male and female elements are in uncoupled configuration. The female quick-connect coupling element comprises an intermediate locking ring, mobile in translation between a rear position, in which an internal wall of the intermediate ring maintains the locking balls protruding in the insertion channel, and a front position of the front side of the female element, in which the locking balls are free to be pushed back opposite the longitudinal axis of the female element under the action of the actuating member.

13 Claims, 9 Drawing Sheets

(56) References Cited

U.S. PATENT DOCUMENTS

| | | | |
|---|---|---|---|
| 7,309,083 B2 | 12/2007 | Tiberghien et al. | |
| 7,926,783 B1 * | 4/2011 | Liu ........................ | F16L 37/44 |
| | | | 251/149.6 |
| 7,938,456 B2 | 5/2011 | Chambaud et al. | |
| 8,356,794 B1 * | 1/2013 | Liu ........................ | F16L 37/23 |
| | | | 251/149.6 |
| 8,641,013 B2 * | 2/2014 | Liu ........................ | F16L 37/42 |
| | | | 251/149.6 |
| 2009/0273183 A1 | 11/2009 | Chambaud et al. | |

FOREIGN PATENT DOCUMENTS

| | | |
|---|---|---|
| CN | 201810828 | 4/2011 |
| DE | 4025385 | 2/1992 |
| DE | 102009048328 | 4/2011 |
| JP | 2002327885 | 11/2002 |
| JP | 2011117581 | 6/2011 |

* cited by examiner

Fig.10

FEMALE QUICK-CONNECT COUPLING ELEMENT, AND A QUICK-CONNECT COUPLING INCORPORATING SUCH AN ELEMENT

The invention relates to a female quick-connect coupling element, as well as to a quick-connect coupling that can be used for the detachable connection of two pressurised fluid pipes and which comprises, among other items, such a female element.

In the field of the detachable connection of pipes through which a pressurised fluid passes, it is known to use a female quick-connect coupling element that comprises a ball-lock system for a male element comprising a collar. A manual outer actuating ring is generally used to unlock the coupling in order to switch from a coupled configuration of the male element fitted in the female element to an uncoupled configuration.

A ball-lock system generally comprises balls protruding in an insertion channel of the female element and which come into contact with a tapered face of the collar of the male element and with an internal wall of the outer actuating ring in order to, in coupled configuration, prevent the disconnection of the male and female elements. When the coupling is unlocked, the outer actuating ring is actuated by sliding towards the rear of the female element, in order to release the locking balls so as to clear the male element from the insertion channel of the female element. The disconnection is particularly difficult at the moment when the operator pushes back the actuating ring, when the balls are jammed in a cone wherein the configuration of the parts creates a resultant of forces that oppose the natural movement of disconnection. The operator must then do this several times in order to attempt to clear the jam of the balls, often blindly, in conditions for accessing the coupling that are difficult. This results in a wear and tear of parts and seals which contributes to malfunctions of the locking system and to the loss of the seal of the coupling.

It is these disadvantages that the inventions more particularly intends to overcome by proposing a new female quick-connect coupling element which is more reliable and easier to manoeuvre than those of prior art, in particular thanks to an improved structure of its ball-lock system, while still retaining an automatic operation and a compact structure.

To this end, the invention relates to a female quick-connect coupling element for the detachable connection of two pressurised fluid pipes, this female element being able to receive by fitting, according to a longitudinal axis of this female element and in an insertion channel located on a front side of the female element, a male coupling element, this female element comprising:
  a body through which passes a conduit for the circulation of fluid,
  balls for locking the male element in a coupled configuration, with these locking balls being positioned in radial housings of the body and able to protrude radially in the insertion channel,
  an actuating member mobile in translation according to a longitudinal axis between a first position, in which the male element is locked in the female element in coupled configuration, and a second position, in which the male and female elements are in uncoupled configuration, during a disconnection manoeuvre of the male element and of the female element.

This female quick-connect coupling element is characterised in that it comprises an intermediate locking ring, mobile in axial translation between a rear position, in which an internal wall of the intermediate ring maintains the locking balls protruding in the insertion channel in coupled configuration of the coupling, and a front position of the front side of the female element, in which the locking balls are free to be pushed back opposite the longitudinal axis of the female element in order to no longer protrude in the insertion channel, under the action of the actuating member during the disconnection manoeuvre.

Thanks to the invention, due to the releasing of the balls in their housing during the disconnection manoeuvre of the coupling, the clearing movement of the intermediate ring, which releases the balls, is carried out towards the front of the female element, in the same direction as the clearing movement of the tip of the male element. This facilitates the disconnection manoeuvre and reduces the efforts applied to the parts and the difficulty of disconnecting the coupling.

According to advantageous but not mandatory aspects of the invention, such a female quick-connect coupling element can incorporate one or several of the following features, taken in any technically permissible combination:
  The female element comprises means for locking in rear position of the intermediate ring in coupled configuration of the coupling, while the unlocking of the intermediate ring towards its front position is triggered by the clearing of the actuating member towards its second position.
  The female element comprises an inner sleeve mounted in the conduit for the circulation of fluid, with the inner sleeve being mobile in translation according to the longitudinal axis of the female element and adapted to drive the intermediate ring towards the rear during the coupling of the female element with the male element under the action of the male element during its insertion, the driving of the intermediate ring being carried out by at least one drive ball mobile in translation in a hole of a wall of the body and protruding on either side of this wall in such a way that, during the translation towards the rear of the inner sleeve, one side of the ball is in contact with a shoulder of the inner sleeve while another side of the ball is in contact with a shoulder of the intermediate ring.
  The female element comprises an inner sleeve mounted in the conduit for the circulation of fluid, with the inner sleeve being mobile in translation according to the longitudinal axis of the female element and adapted to drive the intermediate ring towards the rear during the coupling of the female element with the male element under the action of the male element during its insertion, with the driving of the intermediate ring being carried out by a portion of the inner sleeve, extending radially through a space of the body of the female element and able to exert an axial force on a shoulder of the intermediate ring.
  The actuating member is an outer actuating ring mobile in relation to the body between a first front position and a second rear position, in which it is able to be locked, during the disconnection manoeuvre, while the female quick-connect coupling element comprises means for locking in rear position of the intermediate ring in coupled configuration of the coupling, while the locking in rear position of the outer actuating ring triggers the unlocking of the intermediate ring towards its front position during the disconnection manoeuvre of the coupling and while the female element comprises a spring to push back the intermediate ring towards its front position.

When the outer actuating ring is manoeuvred to its rear position, locking balls located in housings of the body are retracted partially outside of the body in order to maintain the outer actuating ring locked in its rear position during the disconnection manoeuvre of the coupling.

The unlocking of the actuating ring is triggered by the arrival of the intermediate ring in its rear position, while the female element comprises a spring able to push back the actuating ring towards its first position.

The locking ball or balls in rear position of the outer actuating ring also form the means for locking in rear position of the intermediate ring.

The actuating member is a slide mobile according to an axis perpendicular to the longitudinal axis of the female element and mobile between a first retracted position, in which the intermediate ring is maintained locked in rear position using means for locking such as a pin of a slide protruding against a shoulder of the intermediate ring, and a second extended position, in which the intermediate ring is no longer maintained locked in rear position, during the disconnection manoeuvre of the coupling.

The female element comprises balls for guiding the male element, adapted in order to protrude radially in the insertion channel and mounted in housings arranged in a wall of the body of the female element.

The housings in which the guiding balls are mounted are delimited by an internal surface of the intermediate locking ring, while in its movement towards its front position, the intermediate locking ring releases the guiding balls in such a way that they can be pushed back in a groove of the intermediate locking ring and no longer protrude in the insertion channel.

The housings in which the guiding balls are mounted are delimited by a wall of the outer actuating ring, while, in its movement towards its rear position, the outer actuating ring releases the guiding balls in such a way that they can be pushed back in their housings and no longer protrude in the insertion channel.

The internal wall of the intermediate ring, delimiting the housings of the locking balls, has a tapered surface during towards the rear of the female element.

The invention further relates to a quick-connect coupling for the detachable connection of two pressurised fluid pipes, with this coupling comprising two elements respectively male and female, able to fit into one another. This coupling is characterised in that the female element is such as mentioned hereinabove.

The invention shall be better understood and other advantages of the latter shall appear more clearly when reading the following description of three embodiments of a female quick-connect coupling element and of a coupling in accordance with its principle, provided solely by way of example and made in reference to the annexed drawings wherein.

The quick-connect coupling R shown in FIGS. 1 to 6 comprises a female element A and a male element or tip B provided to fit into one another in the direction of an axis X-X' which is, in practice, a longitudinal axis common to elements A and B.

By convention, it is considered that the front portion of an element A or B is the portion of this element turned towards the other element during their connexion.

In this description, the terms "axial", "radial", "axially", "radially" refer to the axis X-X'. A direction is "axial" when it is parallel to the axis X-X', and "radial" when it is perpendicular to the axis X-X' and secant with this axis. A surface is axial when it is perpendicular to the axis X-X', and radial when this surface belongs to the cylinder that surrounds the axis X-X' at a constant radial distance.

The male element B comprises a tubular body 11 which defines a channel 12 for the circulation of fluid under pressure. On its external peripheral surface 16, on the side of a front edge 17, the male element B is provided with a collar 19 of which the profile is defined by a front tapered surface 19a and a rear tapered surface 19b. The tapered surface 19a follows a cone profile of which the top is located on the front side of the male element B, while the tapered surface 19b follows a cone profile of which the top is located on the rear side of the male element B.

The female element A comprises a main body 40. The front portion of the body 40 comprises an insertion channel 42 delimited by a tubular wall 44 centred around the axis X-X'. The body 40 is extended towards the rear by a central chamber 46 connected to the insertion channel 42 by a bore 48. The central chamber 46 is finally connected to a rear channel 50, wherein a fluid pipe is intended to be connected, via a bore 52.

As such, the insertion channel 42, the bore 48, the central chamber 46, the bore 52 and the rear channel 50 together define a conduit 400 for the circulation of fluid under pressure inside the female quick-connect coupling element A.

Inside the conduit 400 for the circulation of fluid, an inner sleeve 60 is mounted slidingly according to the axis X-X'. The inner sleeve 60 constitutes a valve and a generally tubular shape, comprising a front portion 602, a central portion 604 and a rear portion 606. The front portion 602 is adapted to slide in the bore 48, the central portion 604 is adapted to slide in the central chamber 46, and the rear portion 606 is adapted to slide in the bore 52.

The inner sleeve 60 is hollow and its internal volume 600 is open on the front side in the insertion channel 42. On the rear side, the inner sleeve 60 comprises a bottom 608. The rear portion 606 comprises, in the vicinity of the bottom 608, orifices 606*a* distributed advantageously over the circumference of the rear portion 606, and allowing for the passage of fluid between the volume 600 and the rear channel 50, when the inner sleeve 60 is in its rear position, shown in FIG. 4.

Figure 1:
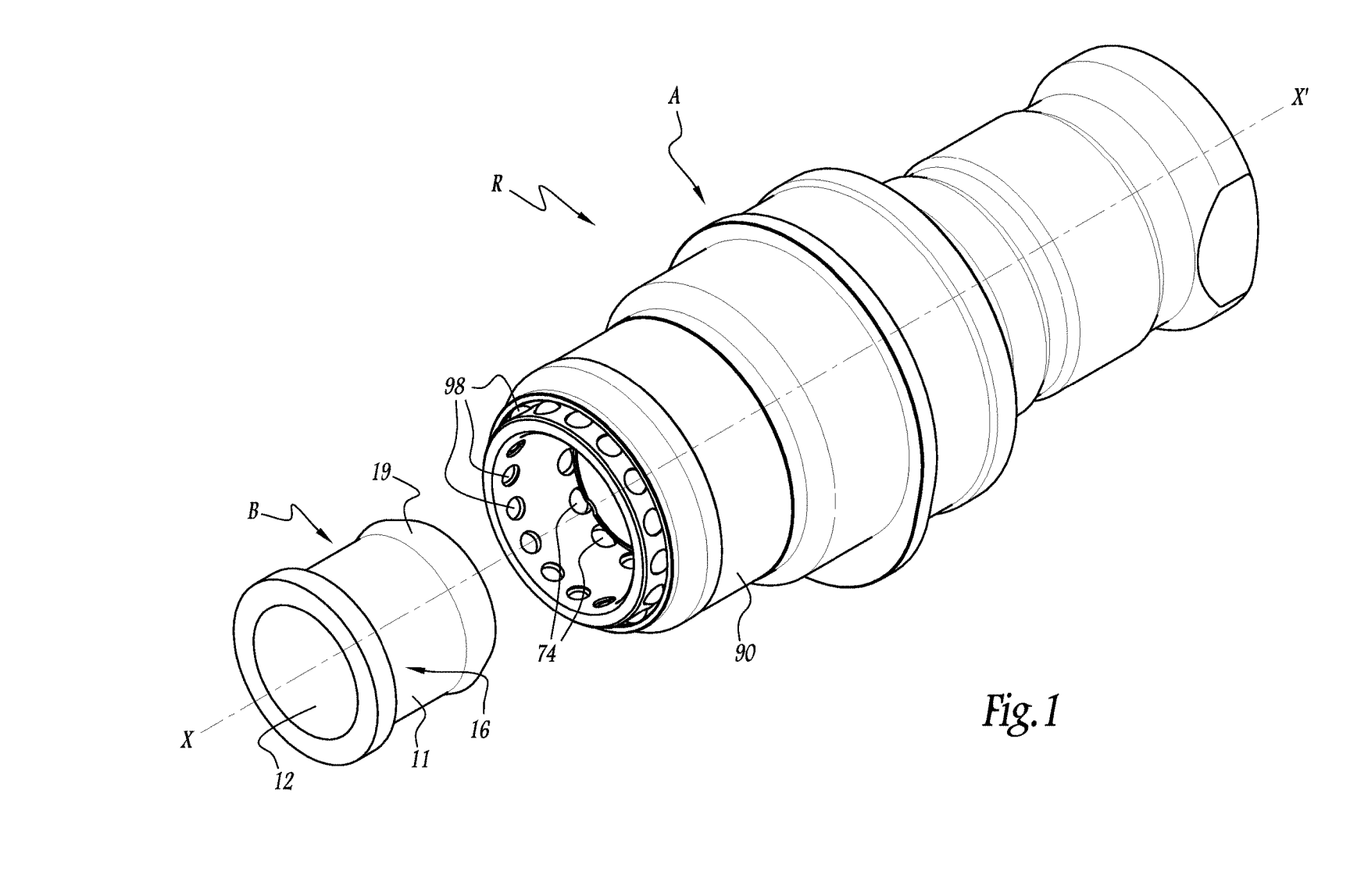
FIG. 1 is a perspective view of a coupling in accordance with the invention incorporating a female element in accordance with the invention and a male element aligned with the female element without being engaged in the latter.
Figure 2:
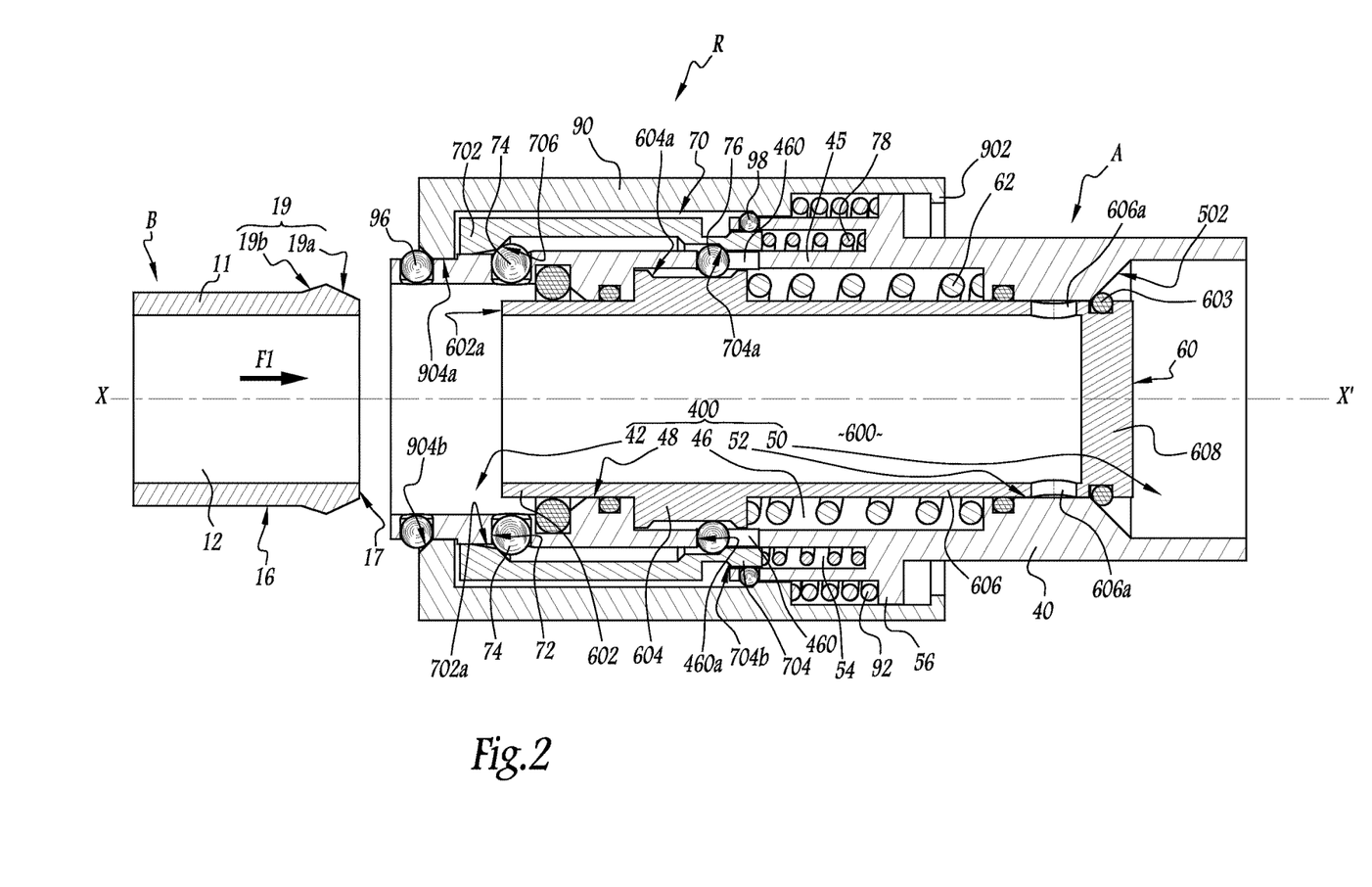
FIG. 2 is a cross-section, along a longitudinal median plane, of the coupling of FIG. 1, in an uncoupled configuration.
Figure 4:
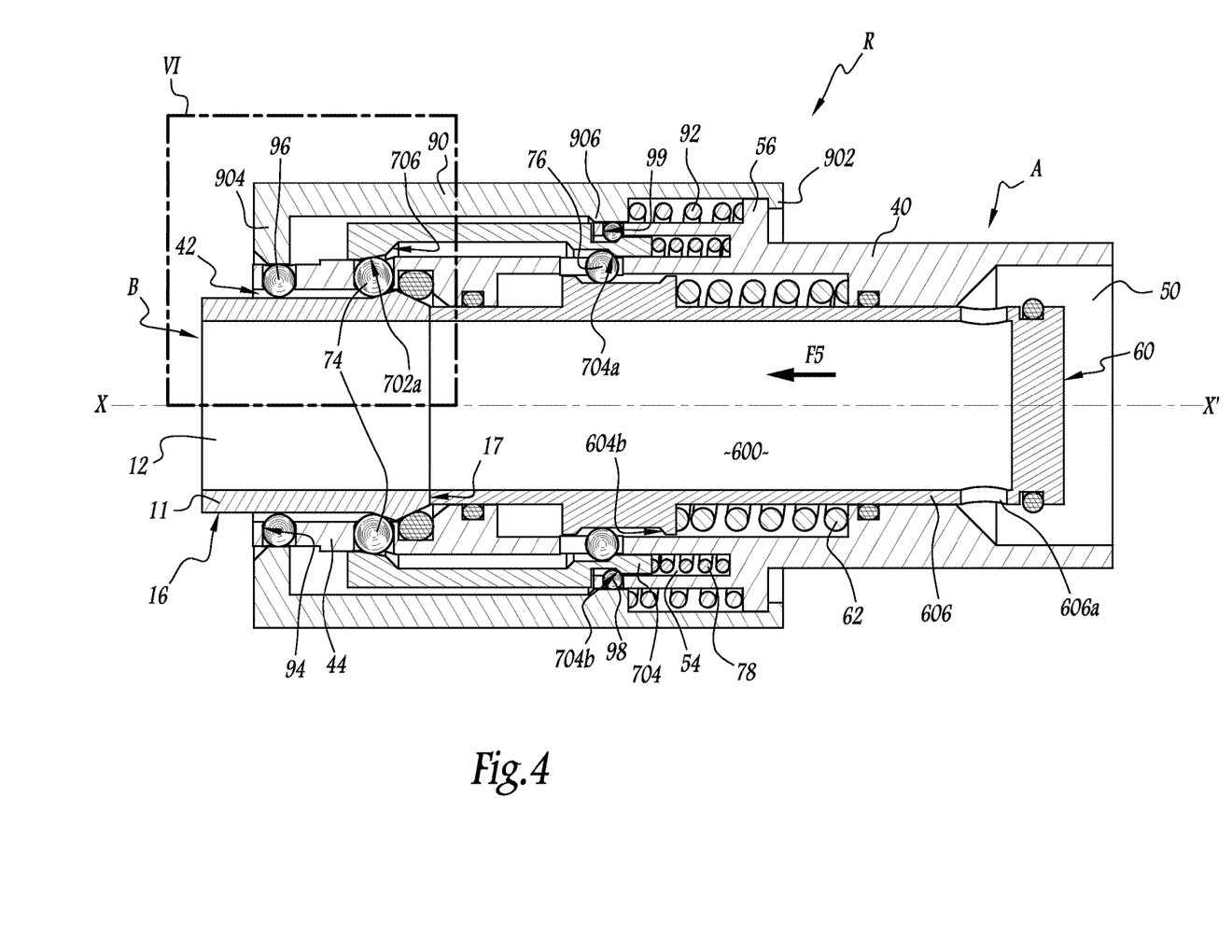
FIG. 4 is a view similar to FIGS. 2 and 3, the male element being locked in the female element.

The inner sleeve 60 is mobile in translation between a front position shown in FIG. 2 and a rear position shown in FIG. 4. The inner sleeve 60 is pushed back towards its front position by a spring 62 housed in the central chamber 46.

The female element A further comprises an intermediate locking ring 70. The intermediate ring 70 is mobile in translation, in relation to body 40, according to the axis X-X'.

The intermediate ring 70 is able to slide by being more or less engaged in an annular housing 54 of the body 40.

A front portion 702 of the intermediate ring 70 defines, with the external radial surface of the tubular wall 44 of the body 40, radial housings 72 for a row of locking balls 74. The locking balls 74 are able to protrude radially in the insertion channel 42 in order to lock the male element B in coupled configuration with the female element A, in the configuration shown in FIG. 4. The front portion 702 of the ring 70 has an internal cylindrical surface 702*a* able to come into contact with the balls 74. In the coupled configuration, the locking balls 74 are maintained in contact with the cylindrical surface 702*a* in a position wherein they emerge from the tubular wall 44 in the insertion channel 42.

The female element A comprises means for driving in translation towards the rear of the intermediate ring 70 by the inner sleeve 60. These means of driving include a row of drive balls, of which only two can be seen in FIGS. 2 to 5 with the reference 76, mobile in translation according to the axis X-X' in holes 460 of a wall 45 of the body 40 delimiting the central chamber 46, radially on the outside. The drive balls 76 protrude radially on either side of the wall 45 of the central chamber 46.

Figure 3:
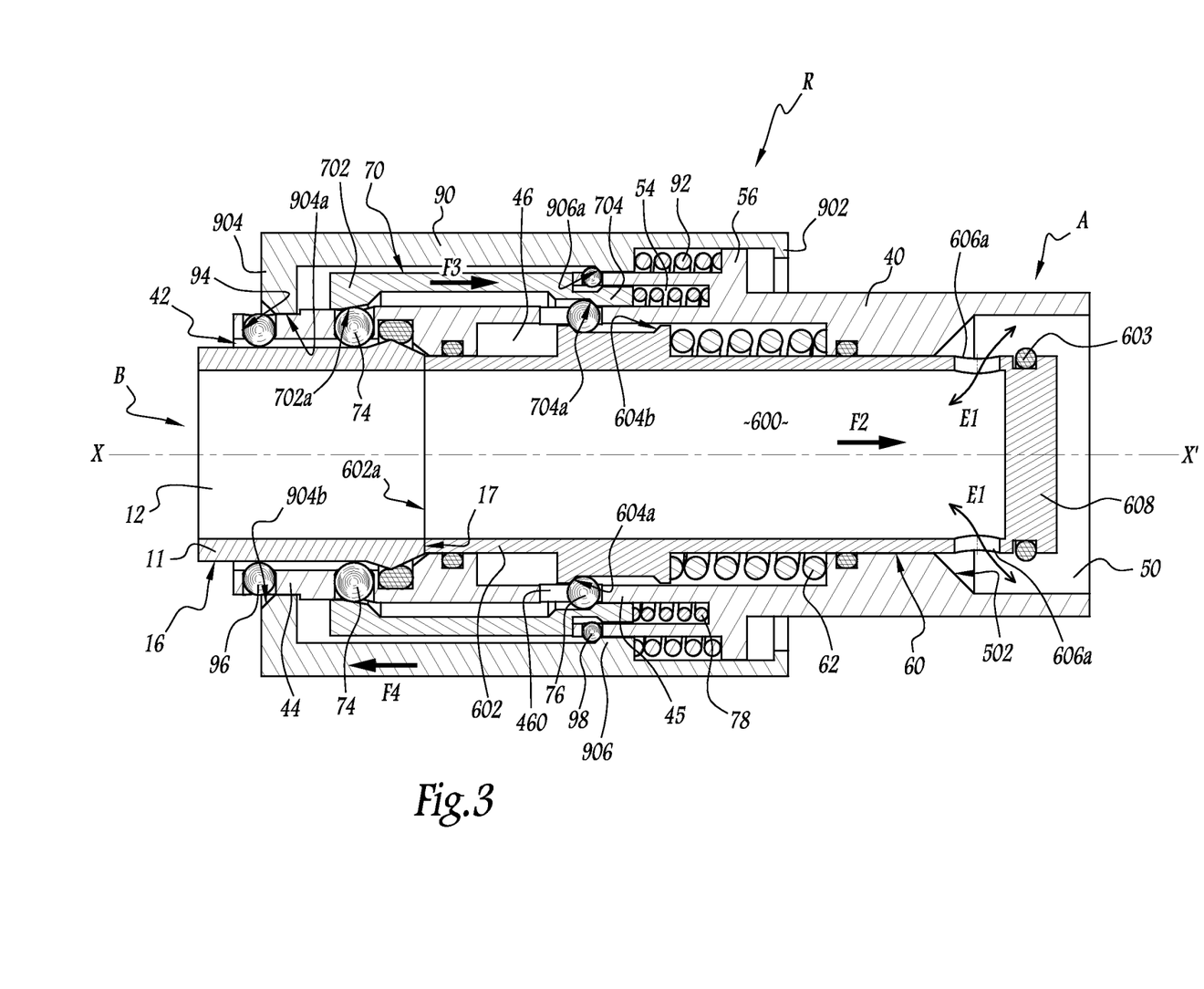
FIG. 3 is a view similar to FIG. 2, with the male element being engaged in the female element.

In the configuration of FIG. 3, wherein the central sleeve 60 drives in translation towards the rear of the intermediate ring 70, the balls 76 are in contact, on the internal side of the holes 460, with a shoulder 604*a* of the central portion 604 of the inner sleeve 60 and, on the external side of the holes 460, with a shoulder 704*a* of a rear portion 704 of the intermediate ring 70.

The intermediate ring 70 is pushed back towards a front position shown in FIG. 2 by a spring 78 housed in the annular housing 54. In its front position, the intermediate ring 70 is in abutment in relation to the body 40, the shoulder 704*a* being in contact with the drive balls 76, which are themselves abutted against a front edge 460*a* of the holes 460.

The female element A is provided with an actuating member mobile in translation according to a longitudinal axis between a first position, in which the male element B is locked in the female element A, and a second position in which the male and female elements are uncoupled, during a disconnection manoeuvre of the male element B from the female element A. In the embodiment of FIGS. 1 to 6, this actuating member is an outer actuating ring 90 mobile in translation in relation to body 40 according to the axis X-X'. The actuating ring 90 can be actuated manually by an operator towards its second position in order to uncouple the female element A and the male element B. The outer actuating ring 90 is pushed back, by a spring 92, towards a front position shown in FIG. 4, corresponding to its first position. In this position, a rear collar 902 of the ring 90 is in contact with an external collar 56 of the body 40, forming an abutment, with this collar 56 also used as a support for the spring 92.

The actuating ring 90 comprises a front wall 904 which extends perpendicularly to the axis X-X' in the direction of the tubular wall 44. An internal surface 904*a* of the front wall 904 defines, with the tubular wall 44, housings 94 for a row of guiding balls 96. The guiding balls 96 are adapted to protrude in the insertion channel 42 in such a way as to guide the external peripheral surface 16 of the male element B. The guiding balls 96 also have for function to limit the swiveling of the male element B around the row of locking balls 74, i.e. a tipping movement around an axis perpendicular to the axis X-X' which would result in a loss of the seal of the connection of the two pipes.

The female element A comprises means for locking the intermediate ring 70 adapted to maintain the inner ring 70 in rear position during the phase of coupling. These means for locking comprise a row of locking balls, of which only two are shown in FIGS. 2 to 5, 7 and 8 with the reference 98, located in housings 99 of the body 40. The locking balls 98 are able to protrude, in relation to the housings 99, in the annular housing 54 in such a way as to serve as an abutment to a shoulder 704*b* of the ring 70, located on an external side of the rear portion 704 in relation to the shoulder 704*a*. The shoulder 704*b* is oriented towards the front of the female element A, in such a way that the movement towards the front of the ring 70 under the effect of the spring 78 is prevented when this shoulder bears against the balls 98. In this configuration shown in FIG. 4, the locking balls 98 protrude in the annular housing 54 under the action of a protruding internal portion 906 of the outer actuating ring 90, which pushes back the locking balls 98 in the direction of the axis X-X'.

Figure 5:
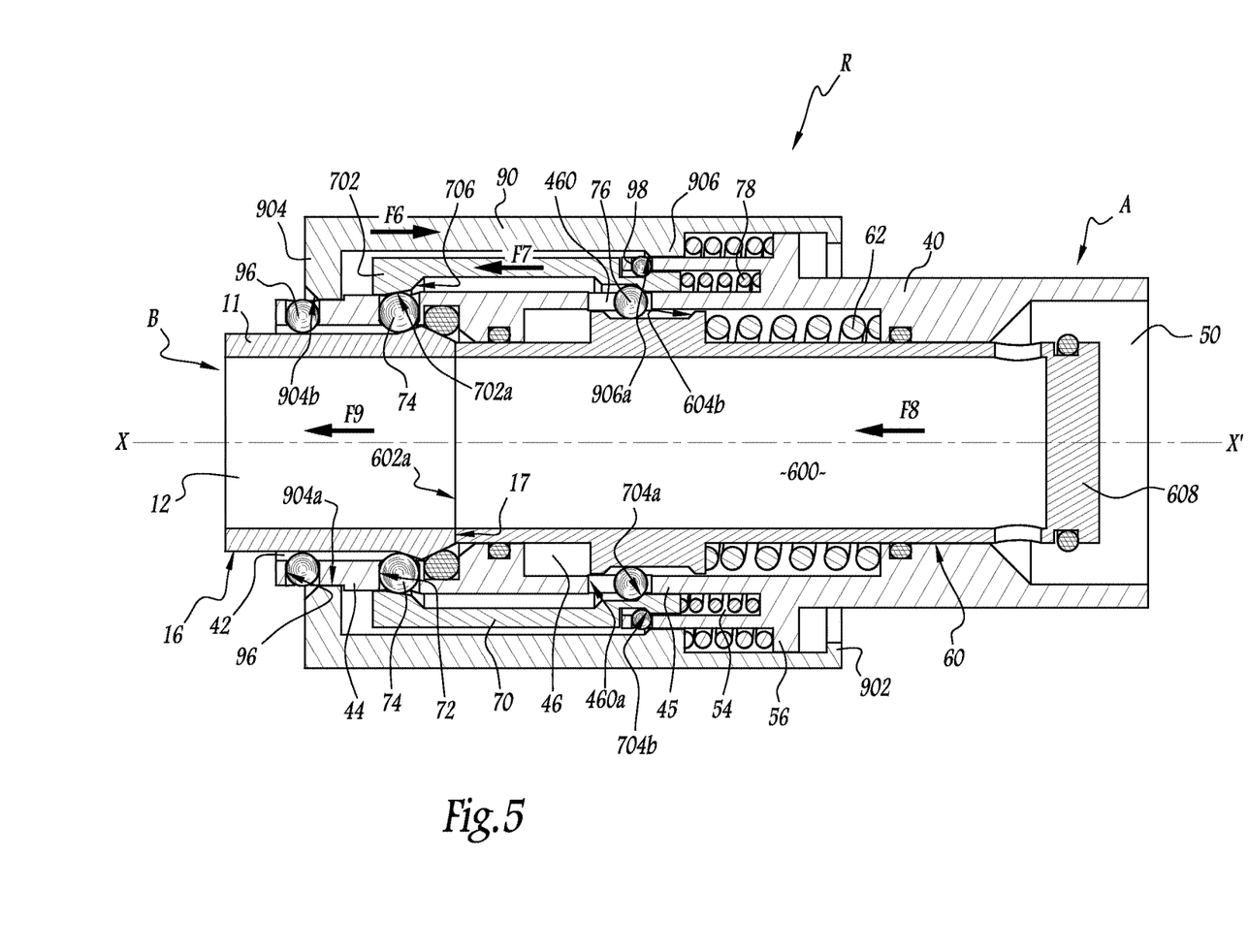
FIG. 5 is a view similar to FIGS. 2 to 4, with an outer actuating ring of the female element being manoeuvred in order to initiate a phase of disconnection.
Figure 6:
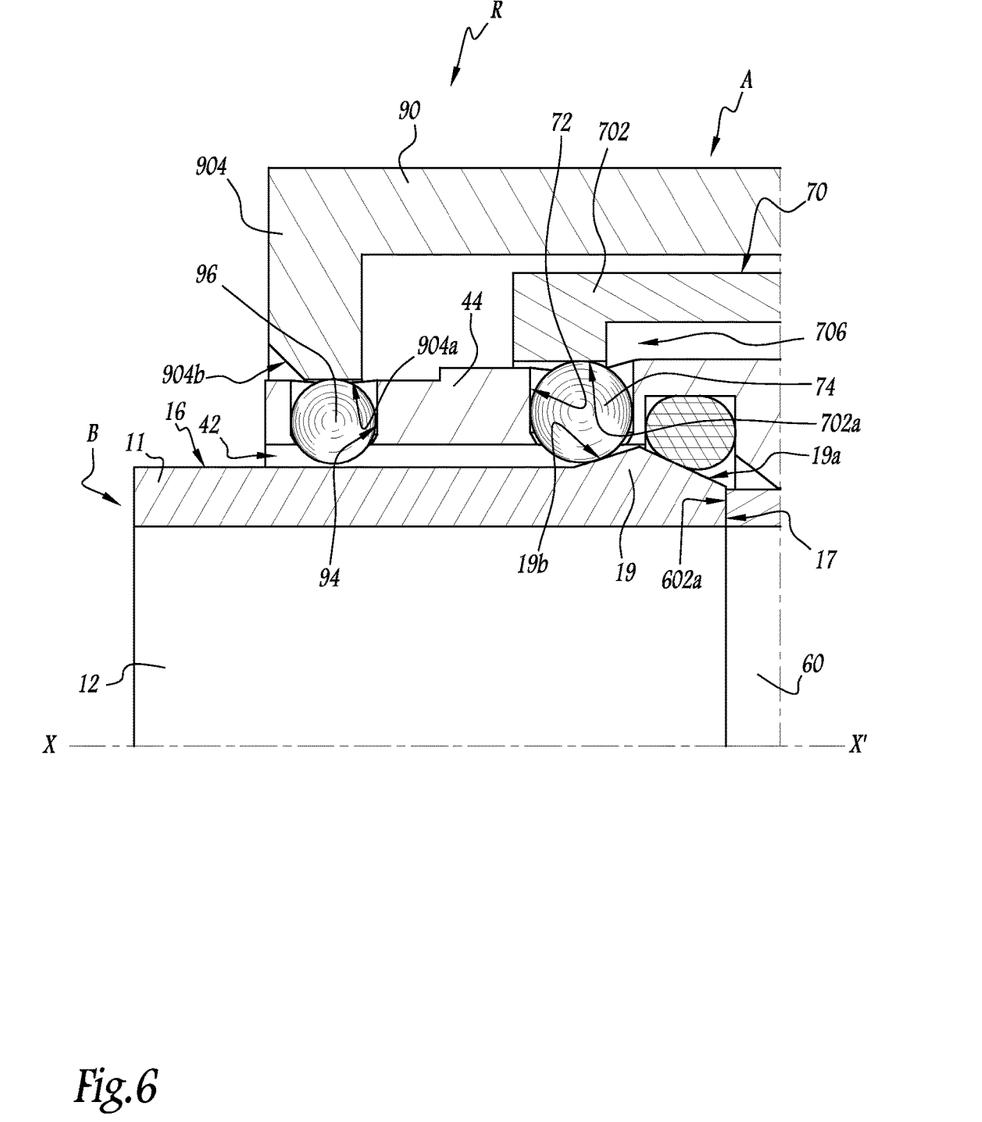
FIG. 6 is a view on a larger scale of the detail VI in FIG. 4.

The female element A further comprises means for locking the outer actuating ring 90 in a rear position shown in FIGS. 2, 3 and 5, corresponding to the second position of the actuating member, in uncoupled configuration. These means comprise the locking balls 98 of the intermediate ring in rear position. As can be seen in the configuration of FIG. 2, the locking balls 98 are able to protrude in such a way as to come into contact with a shoulder 906*a* of the protruding internal portion 906, under the action of the rear portion 704 of the ring 70, which pushes back the locking balls 98 radially opposite the axis X-X'. The shoulder 906*a* is oriented towards the front of the female element A, in such a way that the movement towards the front of the outer actuating ring 90 under the action of the spring 92 is prevented when the ring 90 bears against the balls 98.

The operation of the coupling R is as follows: the uncoupled configuration of the coupling R is shown in FIG. 2. In this configuration, the outer actuating ring 90 is locked in rear position by the locking balls 98. The intermediate ring 70 is pushed back into front position by the spring 78, while the inner sleeve 60 is pushed back into front position by the spring 62. In this configuration, the passage of fluid from the rear channel 50 towards the internal volume 600 through the orifices 606*a* is prevented by the bore 52 and by a joint 603 mounted in the inner sleeve 60 and which exerts a sealed contact against a seat 502 of the rear channel 50. The cooperation of the orifices 606*a*, of the bore 52 and of the seal 603 forms a sealing valve.

In this configuration, the locking balls 74 are free, in such a way that, when the male element B is inserted in the insertion channel 42, the locking balls 74 are pushed back opposite the axis X-X' under the action of the collar 19. In this configuration, the intermediate ring 70 forms housings 706 in which the locking balls 74 are pushed back during the manoeuvre of coupling.

The insertion of the male element B according to the arrow F1 in FIG. 2 continues in such a way that the front edge of the male element B comes into contact with a front edge 602a of the front portion 602 of the inner sleeve 60, as can be seen in FIG. 3. When the contact is established, the inner sleeve 60 is pushed back according to the arrow F2 in FIG. 3, towards the rear of the female element A against the force of the spring 62.

When the male element B is inserted into the insertion channel 42, the guiding balls 96 are pushed back outwards by the collar 19 in a space delimited by a chamfer 904b bordering the surface 904a. Once the collar 19 has exceeded the guiding balls 96, the guiding balls 96 come to protrude in the insertion channel 42 against the external peripheral surface 16 of the male element B. When the movement according to the arrow F1 of the male element B continues, the locking balls 74 are pushed back in the housings 706 by the front surface 19a of the collar 19.

When the movement towards the rear according to the arrow F2 of the inner sleeve 60 starts, the central portion 604 is moved until the shoulder 604a comes into contact with the drive balls 76. The intermediate ring 70 is then driven in a movement towards the rear according to the arrow F3 in FIG. 3, by the drive balls 76. During this movement, the surface 702a of the front portion 702 pushes back the locking balls 74 in the direction of the axis X-X' against the external peripheral surface 16, which locks the male element B in the female element A.

During the movement towards the rear according to the arrow F2 of the inner sleeve 60, the seal 603 is separated from the seat 502 and the orifices 606a open into the rear channel 50, which makes possible a flow E1 of the fluid between the internal volume 600 and the rear channel 50, or vice versa.

In the configuration of FIG. 3, the intermediate ring 70 is in abutment in its rear position. It therefore no longer pushes back the locking balls 98 outwards. This has for effect to release the movement of the outer actuating ring 90 towards the front according to the arrow F4 under the effect of the spring 92. During the movement according to the arrow F4, the protruding internal portion 906 pushes back the locking balls 98 in the direction of the axis X-X' in such a way that they protrude in the annular housing 54, as shown in FIG. 4. When the ring 90 arrives in abutment against the collar 56, the locking balls 98 lock the intermediate ring 70 in its rear position.

The locking in rear position of the intermediate locking ring 70 requires an overtravel of the inner sleeve 60 in relation to its position in the coupled configuration of the coupling R. Therefore, when the driving towards the rear of the intermediate ring 70 by the drive balls 76 is complete, the inner sleeve 60 carries out a return movement towards the front according to the arrow F5 under the action of the spring 62. This movement has for effect to push back the male element B towards the rear in such a way that the rear surface 19b of the collar 19 enters into contact with the locking balls 74, which are, in this configuration, pushed back in the insertion channel 42 by the intermediate ring 70, itself locked in rear position. In this configuration, the coupling of the male element B in the female element A is complete and the female A and male B elements of the coupling are locked in the coupled configuration.

The locking is obtained automatically without requiring any intervention from an operator other than the insertion of the male element B in the insertion channel 42 of the female element A. The overtravel of the inner sleeve 60 requires that the operator insert the male element until he feels a click making it possible to identify the locking in rear position of the intermediate ring 70 and that he observes the arrival as abutment in the front position of the actuating ring 90. This improves the reliability of the manoeuvre of coupling and ensures for the operator that the locking is properly obtained when he releases his action on the male element B.

In order to uncouple the coupling R, the actuating ring 90 is cleared manually by an operator towards its rear position according to the arrow F6 in FIG. 5. This movement has for effect that the locking balls 98 are no longer pushed back by the portion 906 against the shoulder 704b of the intermediate ring 70. The locking balls 98 are therefore free to be pushed back outwards by the shoulder 704b under the effect of the spring 78. The intermediate locking ring 70 is then pushed back towards the front, according to the arrow F7 in FIG. 5.

In its movement towards the front, the intermediate ring 70 drives the drive balls 76 thanks to the shoulder 704a.

When the intermediate locking ring 70 is pushed back towards the front, it releases the locking balls 74 in such a way that they can be pushed back opposite the axis X-X' in the housings 706 of the ring 70. Under the action of the spring 62, the inner sleeve 60 carries out a movement towards the front according to the arrow F8. This movement is allowed for the translation towards the front of the drive balls 76 which do not obstruct the translation of the inner sleeve 60. As the locking balls 74 are free to be pushed back in the housings 706, the movement of the inner sleeve 60 drives a withdrawal movement according to the arrow F9 of the male element B, towards the rear. The collar 19 pushes back the locking balls 74, then the guiding balls 96, which can be pushed back from the axis X-X' thanks to the translation towards the rear of the actuating ring 90. At this time, the disconnection manoeuvre is complete. The inner sleeve 60 returns to its front position, in which the orifices 606a are masked by the bore 52 and the seal 603 rests against the seat 502. The drive balls 76 are pushed back towards the front in their position of FIG. 2, by a shoulder 604b of the inner sleeve 60.

During the unlocking movement according to the arrow F7 of the intermediate ring 70, the locking balls 98 are pushed back opposite the axis X-X' in such a way that they lock in rear position the actuating ring 90, as is the case in FIG. 2.

The surface 702a is advantageously tapered and open towards the rear of the female element A, which makes it possible to facilitate the disconnection manoeuvre. In an alternative shown in FIG. 6, the surface 702a is cylindrical and centred around the axis X-X'.

In that the clearing movement of the male element B is carried out in the same direction as the unlocking movement of the intermediate locking ring 70, there is no problem of the locking balls 74 jamming during the disconnection manoeuvre. The costs for maintaining and for replacing used parts are as such reduced. The matting of components of the coupling caused by jamming is prevented. The manipulations of the coupling by an operator are faster, more ergonomic and require less disconnection efforts.

The clearing of the male element B being obtained thanks to the action of the spring 62 on the inner sleeve 60 and, the locking of the coupling R being automatic, the coupling can be manoeuvred by the operator with one hand.

Figure 7:
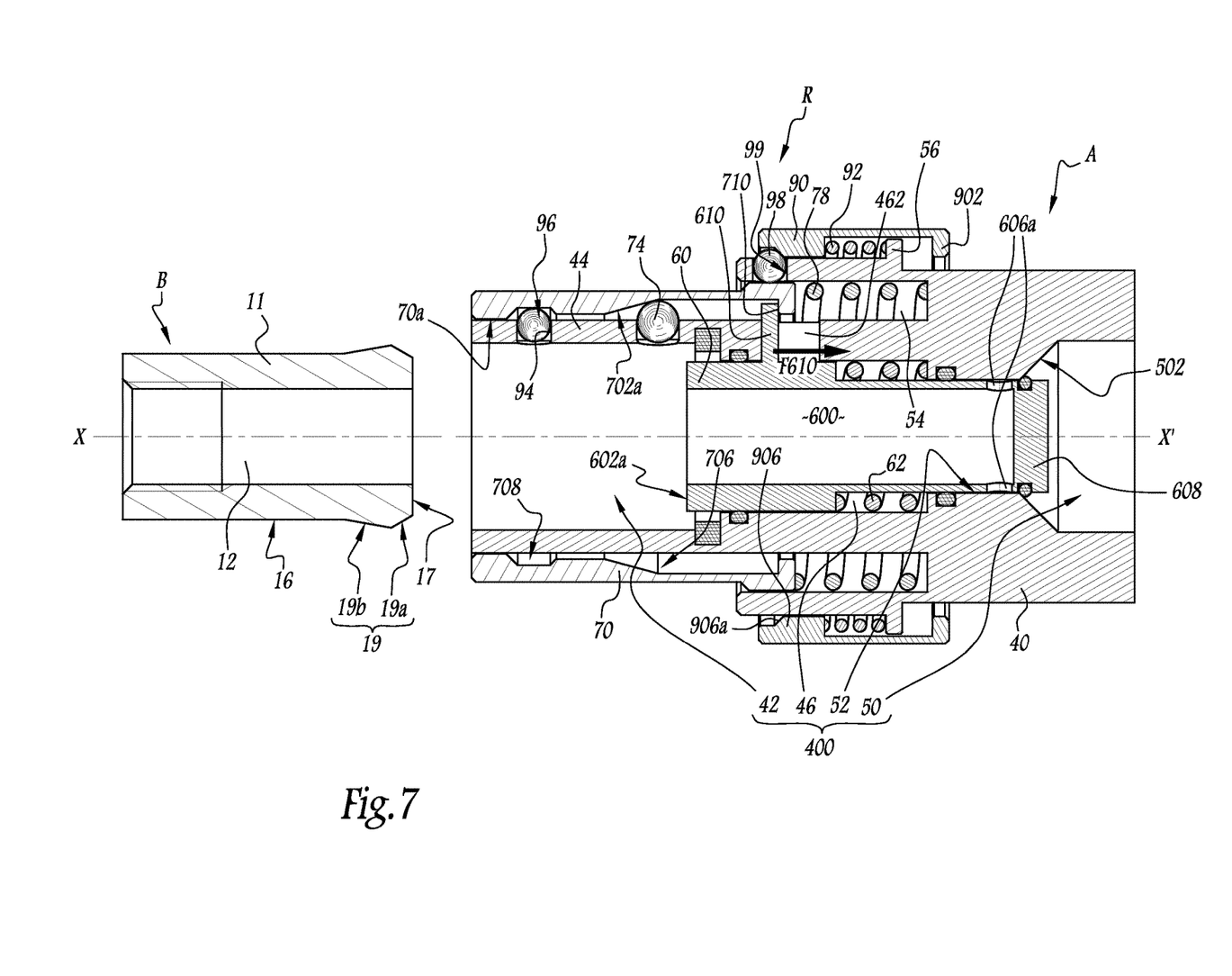
FIG. 7 is a view similar to FIG. 2, for a second embodiment of a female quick-connect coupling element in accordance with the invention, a male quick-connect coupling element being shown in uncoupled configuration.
Figure 8:
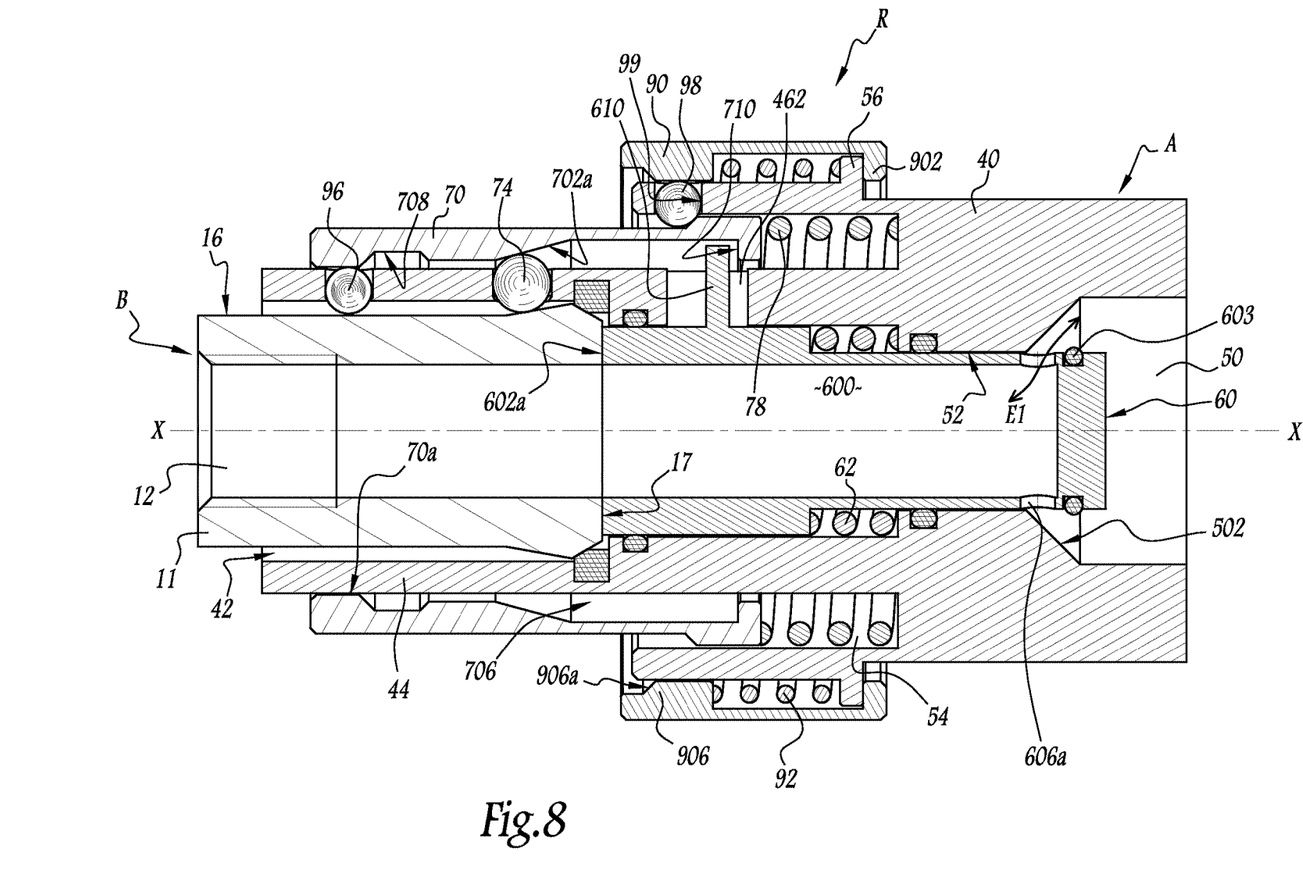
FIG. 8 is a view similar to FIG. 7, but on a larger scale, in a locked configuration of the male element in the female element.

A second embodiment of the invention is shown in FIGS. 7 and 8. In this embodiment, the elements that are common to the first embodiment bear the same references and operate in the same way. Only the details on the differences in relation to the embodiment of FIGS. 1 to 6 are provided hereinafter.

In this embodiment, the housings 94 are delimited by an internal surface 70*a* of the intermediate ring 70. The guiding balls 96 are able to be pushed back opposite the axis X-X' in a peripheral groove 708 of the internal surface 70*a*. In this case, the intermediate ring 70 protrudes outside of the body 40. The outer actuating ring 90 has a dimension that is shorter according to the axis X-X' than in the first embodiment and its function is limited to controlling the unlocking of the intermediate locking ring 70.

In this embodiment, the driving in translation towards the rear of the inner ring 70 by the inner sleeve 60 is not carried out by drive balls but by a pin 610 of the inner sleeve 60, which extends radially opposite the axis X-X' through a space 462 of the body 40. The space 462 extends between the central chamber 46 and the annular housing 54. Through this space 462, the finger 610 exerts an axial force F610 directed towards the rear of the female element A on a shoulder 710 located at the rear of the intermediate ring 70. The shoulder 70 is orientated towards the front of the female element A, in such a way that, during the movement towards the rear of the inner sleeve 60, the axial force F610 exerted by the finger 610 also drives the intermediate ring 70 towards the rear.

This alternative structure of the means for driving towards the rear of the intermediate ring 70 by the inner sleeve 60 can be applied to the embodiment of FIGS. 1 to 6.

According to an embodiment not shown of the invention, the driving in translation of the intermediate locking ring 70 can also be carried out by a wedge or any other part that is protruding adapted to transmit an axial effort F610 to the intermediate ring 70 during the movement towards the rear of the inner sleeve 60.

Figure 9:
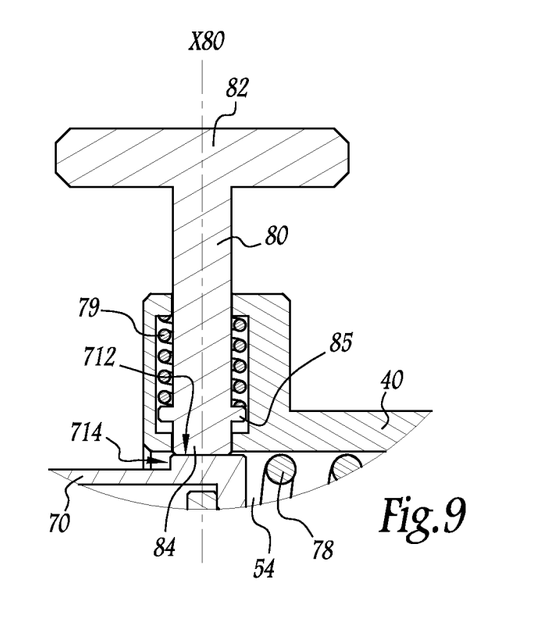
FIG. 9 is a view of an actuating member of a female quick-connect coupling element in accordance with the third embodiment of the invention, in an unlocked configuration.
Figure 10:
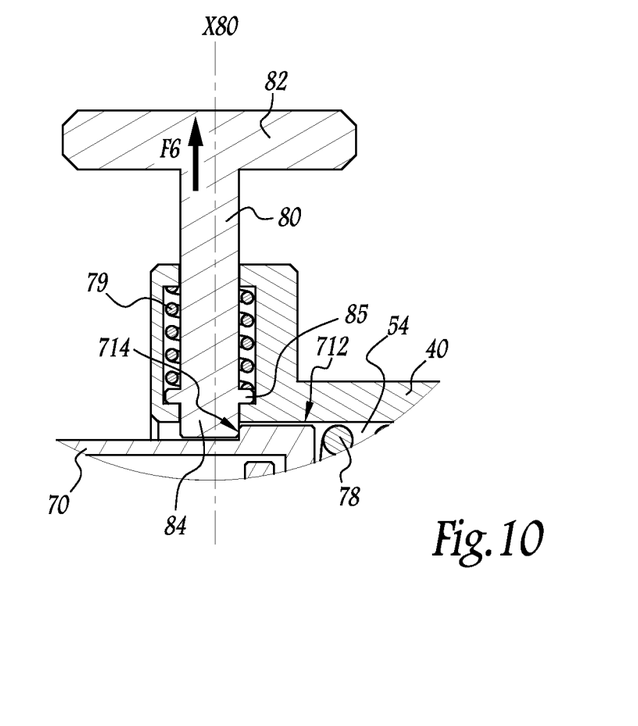
FIG. 10 is a view similar to FIG. 9, the actuating member being shown in locked configuration.

A third embodiment of the invention is shown in FIGS. 9 and 10. In this embodiment, the actuating member of the female element A is not an outer actuating ring 90 but a slide 80 mounted in a cylindrical housing of the body 40. The slide 80 is adapted to slide according to a radial axis X80 in relation to the axis X-X'. The slide 80 bears a control portion 82, which can take the form of a push-button or of a handle that protrudes outside of the body 40. At its end opposite the control portion 82, the slide 80 comprises a locking pin 84. In the configuration of FIG. 9, the slide 80 is pushed back by an external radial surface 712 of the intermediate ring 70 towards an extended position corresponding to the second position of the actuating member, which also corresponds to the rear position of the actuating ring 90. In this extended position, the slide 80 is locked against the action of a spring 79, which exerts a force according to the axis X80 that tends to push the slide 80 back towards a retracted position corresponding to the first position of the actuating member, which also corresponds to the front position of the outer actuating ring 90, shown in FIG. 10. The spring 79 presses against a rib 85 of the slide 80.

During the coupling of the male element B in the female element A, the kinetics of the coupling R causes a movement to intervene towards the rear of the intermediate locking ring 70. When this movement intervenes, the slide 80 is no longer pushed back towards its extended position by the surface 712 of the ring 70. Consequently, the slide 80 is pushed back in its retracted position by the spring 79. In this configuration, the intermediate locking ring 70 is locked in rear position by the locking pin 84, which protrudes in the annular housing 54 and forms an abutment. The intermediate locking ring 70 comprises a shoulder 714 oriented towards the front of the female element A. In the retracted position of the slide 80, the pressing of the shoulder 714 against the locking pin 84 prevents the movement towards the front of the intermediate ring 70 under the action of the spring 78.

In order to unlock the intermediate ring 70 and uncouple the male B and female A elements, the slide 80 is drawn upwards according to the arrow F6 in FIG. 10. The ring 70 is unlocked and the disconnection kinematics takes place in the same way as in the embodiments of FIGS. 1 to 8.

The characteristics of this embodiment can be applied to the first two embodiments of the invention.

The invention claimed is:

1. A female quick-connect coupling element receives for the detachable connection of two pressurised fluid pipes, the female element by fitting, along a longitudinal axis of the female element and in an insertion channel located on a front side of the female element, a male coupling element, the female element comprising:
   a body through which passes a conduit for the circulation of fluid;
   balls for locking the male element in a coupled configuration, with these locking balls being positioned in radial housings of the body and able to protrude radially in the insertion channel; and
   an actuating member mobile in translation along the longitudinal axis between a first front position, in which the male element is locked in the female element in a coupled configuration, and a second rear position, in which the male element and the female element are in an uncoupled configuration, during a disconnection maneuver of the male element and the female element,
   wherein the female quick-connect coupling element includes an intermediate locking ring mobile in axial translation between a rear position, in which an internal wall of the intermediate ring maintains the locking balls protruding in the insertion channel in a coupled configuration of the coupling, and a front position of the front side of the female element, in which the locking balls are free to be pushed back opposite the longitudinal axis of the female element in order to no longer protrude in the insertion channel,
   wherein the intermediate ring is pushed back to its front position under the action of the actuating member during the disconnection maneuver, and
   wherein the female element further comprises means of locking in rear position of the intermediate ring in the coupled configuration of the coupling, wherein the unlocking of the intermediate ring towards its front position is triggered by the clearing of the actuating member towards its second rear position.

2. The female quick-connect coupling element according to claim 1, further comprising an inner sleeve mounted in the conduit for the circulation of fluid, with the inner sleeve being mobile in translation according to the longitudinal axis of the female element and adapted to drive the intermediate ring towards the rear during the coupling of the female element with the male element under the action of the male element during its insertion, with the driving of the intermediate ring being carried out by at least one drive ball mobile in translation in a hole of a wall of the body and protruding on either side of the wall in such a way that, during the translation towards the rear of the inner sleeve, one side of the ball is in contact with a shoulder of the inner sleeve while another side of the ball is in contact with a shoulder of the intermediate ring.

3. The female quick-connect coupling element according to claim 1, further comprising an inner sleeve mounted in the conduit for the circulation of fluid, with the inner sleeve being mobile in translation according to the longitudinal axis of the female element and adapted to drive the intermediate ring towards the rear during the coupling of the female element with the male element under the action of the male element during its insertion, with the driving of the intermediate ring being carried out by a portion of the inner sleeve, extending radially through a space of the body of the female element and able to exert an axial force on a shoulder of the intermediate ring.

4. The female quick-connect coupling element according to claim 1, wherein the actuating member is an outer actuating ring mobile in relation to the body between the first front position thereof and the second rear position thereof, in which it is able to be locked, during the disconnection maneuver,
   wherein the female quick-connect coupling element comprises means for locking in rear position of the intermediate ring in the coupled configuration of the coupling,
   wherein the locking in the second rear position of the outer actuating ring triggers the unlocking of the intermediate ring towards its front position during the disconnection maneuver of the coupling, and
   wherein the female element comprises a spring able to push back the intermediate ring towards its front position.

5. The female quick-connect coupling element according to claim 4, wherein when the outer actuating ring is maneuvered to its second rear position, locking balls located in housings of the body are retracted partially outside of the body in order to maintain the outer actuating ring locked in its second rear position during the disconnection maneuver of the coupling.

6. The female quick-connect coupling element according to claim 5, wherein the unlocking of the actuating ring is triggered by the arrival of the intermediate ring in its rear position, and
   wherein the female element comprises a spring able to push back the actuating ring towards its first front position.

7. The female quick-connect coupling element according to claim 5, wherein the balls for locking in the second rear position of the outer actuating ring also form the means for locking in rear position of the intermediate ring.

8. The female quick-connect coupling element according to claim 1, wherein the actuating member is a slide mobile according to an axis perpendicular to the longitudinal axis of the female element and mobile between a first retracted position, in which the intermediate ring is maintained locked in rear position using means for locking such as a pin of the slide protruding against a shoulder of the intermediate ring, and a second extended position, in which the intermediate ring is no longer maintained locked in rear position, during the disconnection maneuver of the coupling.

9. The female quick-connect coupling element according to claim 1, further comprising guiding balls for guiding the male element adapted to protrude radially in the insertion channel and mounted in housings arranged in a wall of the body of the female element, wherein the guiding balls are supplementary to the locking balls.

10. The female quick-connect coupling element according to claim 9, wherein the housings in which the guiding balls are mounted are delimited by an internal surface of the intermediate locking ring and movement of the intermediate locking ring towards its front position releases the guiding balls such that the guiding balls can be pushed back in a groove of the intermediate locking ring and no longer protrude in the insertion channel.

11. The female quick-connect coupling element according to claim 4, further comprising guiding balls for guiding the male element adapted to protrude radially in the insertion channel and mounted in housings arranged in a wall of the body of the female element,
   wherein the guiding balls are supplementary to the locking balls, and
   wherein the housings in which the guiding balls are mounted are delimited by a wall of the outer actuating ring and movement of the outer actuating ring towards its second rear position releases the guiding balls such that the guiding balls can be pushed back in their housings and no longer protrude in the insertion channel.

12. The female quick-connect coupling element according to claim 1, wherein the internal wall of the intermediate ring, delimiting the housings of the locking balls, has a tapered surface diverging towards the rear of the female element.

13. A quick-connect coupling for the detachable connection of two pressurised fluid pipes, this coupling comprising two elements respectively male and female, receiving the male, wherein the female element is according to claim 1.

* * * * *